United States Patent
Coyne et al.

(10) Patent No.: US 7,475,034 B2
(45) Date of Patent: Jan. 6, 2009

(54) PROCESS FOR DETERMINING AN AUCTION METHODOLOGY

(75) Inventors: Joseph P. Coyne, Elderslie (GB); Harold A. Daub, Halifax, PA (US); Judy J. Kogut-O'Connell, Hopewell Junction, NY (US); Teresa G. Fiore, Woodbury, CT (US); Michael A. Fortine, Lake Katrine, NY (US); Pamela K. Lowe, Cumming, GA (US); Aldo Morandin, Monza (IT); Yoshiaki Ohsumi, Chigasaki (JP); Jose de Jesus Michel Rodriguez, Danbury, CT (US); Anne C. Ten Dyke, Durham, NC (US); Warren Jy Wu, Taipei (TW); John J. Yuskis, III, Kensington, CT (US); Paul A. Zulpa, Woodbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1216 days.

(21) Appl. No.: 10/095,237

(22) Filed: Mar. 11, 2002

(65) Prior Publication Data
US 2003/0172022 A1 Sep. 11, 2003

(51) Int. Cl.
*G06Q 40/00* (2006.01)
(52) U.S. Cl. .......................... 705/37; 705/35; 707/202; 707/3
(58) Field of Classification Search .................. 705/37, 705/35; 707/3, 202
See application file for complete search history.

(56) References Cited

U.S. PATENT DOCUMENTS

2002/0128948 A1* 9/2002 Wiesehuegel et al. ......... 705/37
2003/0163410 A1* 8/2003 Byde et al. .................... 705/37

OTHER PUBLICATIONS

Frey, Bruce; "Online Auctions," copyright 2000, ISBN: 0-7821-2708-8, 17 pages attached.*
Klemperer, Paul, "Auction: theory & Practice", 1 page attached.*
Krishna, Vijay, "Auction Theory", 1 page attached.*

* cited by examiner

*Primary Examiner*—Mary Cheung
*Assistant Examiner*—Kirsten S Apple
(74) *Attorney, Agent, or Firm*—Gibb & Rahman, LLC; Timothy M. Farrell, Esq.

(57) ABSTRACT

A computer data processing system executing a method for selecting an auction methodology for a buyer/supplier procurement process, wherein the method comprises determining an auction scope in the data processing system, determining an auction interaction in the data processing system, determining an auction control in the data processing system, determining an auction pricing in the data processing system, determining a set of auction closing rules in the data processing system, determining an auction iteration in the data processing system, and selecting an auction methodology based on the auction scope, the auction interaction, the auction control, the auction pricing, the auction closing rules, and the auction iteration.

21 Claims, 8 Drawing Sheets

PROCESS FOR DETERMINING AN AUCTION METHODOLOGY

BACKGROUND OF THE INVENTION

1. Field of the Invention

The present invention generally relates to automated auction systems and methods, and more particularly to an automated auction system for use in buyer/supplier procurement processes.

2. Description of the Related Art

Customarily, buyers request bids on various types of products or services from suppliers. For example, companies routinely provide their suppliers with public and directed requests for information (RFI), requests for quotations (RFQ), and requests for proposals (RFP). In an effort to provide the requested information, companies often utilize web-based systems such as International Business Machine's Internet Quoting Tool (IQT), available from IBM, Armonk, N.Y., USA. Once the buyer receives all of the information, quotations, and/or proposals (i.e., bids) from the suppliers, the buyer analyzes the various bids to determine which supplier to select.

For example, IBM's IQT system provides the following. It provides a company's ability to respond to business opportunities by making relevant requests for products and services more visible. It provides an effective tool to create responses. Also, it brings web-based efficiency to the procurement process.

Specifically, the current IBM IQT system reduces administrative costs and cycle times because it eliminates the need to use conventional communication tools such as mailing or faxing. Furthermore, because buyers (companies) make more detailed and concise requests, the supplier knows exactly what the buyer (company) is asking and, consequently, the response is clearer and more accurate.

Generally, in a procurement process, a supplier is an entity responsible for providing quotations for products and/or services requested by a buyer. A buyer generates requests and evaluates responses to identify the most competitive supplier(s) to provide specific products or services. A request is a document created by a buyer for procuring products and/or services. The request is either in the form of a Request for Quote (RFQ), Request for Proposal (RFP), or a Request for Information (RFI). A response is an answer provided by a supplier to a request for products and/or services from a buyer.

A Request for Quote is a type of request whereby the buyer has the intention to award the work after completing the evaluation process. Usually, this type of request requires a standard response from the supplier(s) such as pricing and delivery information. Similarly, a Request for Proposal is a type of request whereby the buyer has the intention to award the work after completing the evaluation process. Usually, this type of request is more complex than an RFQ and requires more detailed information of the supplier(s) other than just pricing and delivery information. However, a Request for Information is a type of request whereby the buyer has no intention to award the work after completing the evaluation process. This type of request is usually for information gathering, market intelligence, and benchmarking.

Furthermore, there are two broad categories of requests, directed and public. A directed request is a request that is posted to specific companies to review or respond to, whereas a public request is a request that is posted to any and all suppliers. For example, public requests are posted on the Public Requests page on IBM's IQT web-based system. In the IQT system, a supplier does not have to be registered with the IQT to view a public request, but the supplier must be registered to respond.

The concept of receiving bids from suppliers is well-known in business. It is also known that reviewing each bid and comparing them against other bids often results in unnecessary increases in cycle times and administrative costs. Thus, it is critical that a structured methodology become available to aid professionals in reducing cycle times and administrative costs, as well as achieving other efficiencies in the procurement process.

While the conventional IQT process provides a valuable system of providing and gathering information, and consolidating requests for buyers, there remains a need for a new automated system which can be used in conjunction with the current IQT processes and which provides an auction methodology to be used during RFQ, RFP, or RFI processes.

SUMMARY OF THE INVENTION

In view of the foregoing, the present invention has been devised, and it is an object of the present invention, to provide an automated system and method for determining the type of auction methodology to be used during RFQ, RFP, or RFI processes.

In order to attain the object(s) suggested above, there is provided, according to one aspect of the invention, a computer system and method for selecting an auction methodology for a buyer/supplier procurement process. As such, the concept of auctioning is new in the procurement forum. That is, it has not yet been suggested to allow suppliers the ability to essentially "bid against" one another as one would do in an auction setting, thereby further reducing cycle times and administrative costs for the buyer, as the buyer would no longer be required to review every bid entered by the various suppliers. Rather, the supplier who "out bids" the other suppliers would simply be selected by the buyer.

Thus, a novel method is disclosed comprising, first, determining an auction scope in a data processing system. Then, an auction interaction is determined in the data processing system. Next, an auction control is determined in the data processing system; after which, an auction pricing is determined in the data processing system. Upon completion of this step, a set of auction closing rules is determined in the data processing system. Then, an auction iteration is determined in the data processing system. Finally, an auction methodology is selected based on at least one of the auction scope, the auction interaction, the auction control, the auction pricing, the auction closing rules, and the auction iteration.

The step of determining an auction scope comprises determining whether a request for a bid from a supplier is one of a public request or a directed request. Moreover, the step of determining an auction interaction comprises selecting one of an open-cry auction methodology, a sealed-bid auction methodology, an anonymous auction methodology, or a non-anonymous auction methodology. Furthermore, the step of determining an auction control comprises selecting one of a regular reverse auction methodology or a Dutch reverse auction methodology. Also, the step of determining an auction pricing comprises selecting one of a discriminative auction methodology or a non-discriminative auction methodology.

Additionally, the step of determining a set of auction closing rules comprises ending an auction with one or more of a buyer's manual intervention, a fixed-time intervention, or an automatic intervention, wherein the automatic intervention occurs after a predetermined amount of supplier inactivity in the auction. Moreover, the step of determining an auction iteration comprises selecting one of a single round iteration methodology or a multiple-round iteration methodology.

As mentioned, the present invention allows suppliers the ability to essentially "bid against" one another as one would do in an auction setting, thereby further reducing cycle times and administrative costs for the buyer, as the buyer would no longer be required to review every bid entered by the various suppliers. Rather, the supplier who "out bids" the other suppliers would simply be selected by the buyer.

Moreover, the present invention factors in several control elements which significantly impact the auction selection process, thereby streamlining the entire process and, thus, making the selection of the type of auction methodology ultimately chosen the correct decision. This assures the buyer that its procurement process is functionally optimal and is saving the buyer resources and money as it results in an efficient procurement system. Furthermore, by implementing the present invention into a web-based system, it provides an alternative, yet novel, solution to the conventional quoting/bidding systems.

Moreover, the present invention provides a means for encompassing the company guidelines for assuring business control guidelines and enforcing and eliminating possible reciprocity or business conflict claims for ethics violations.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

Figure 1:
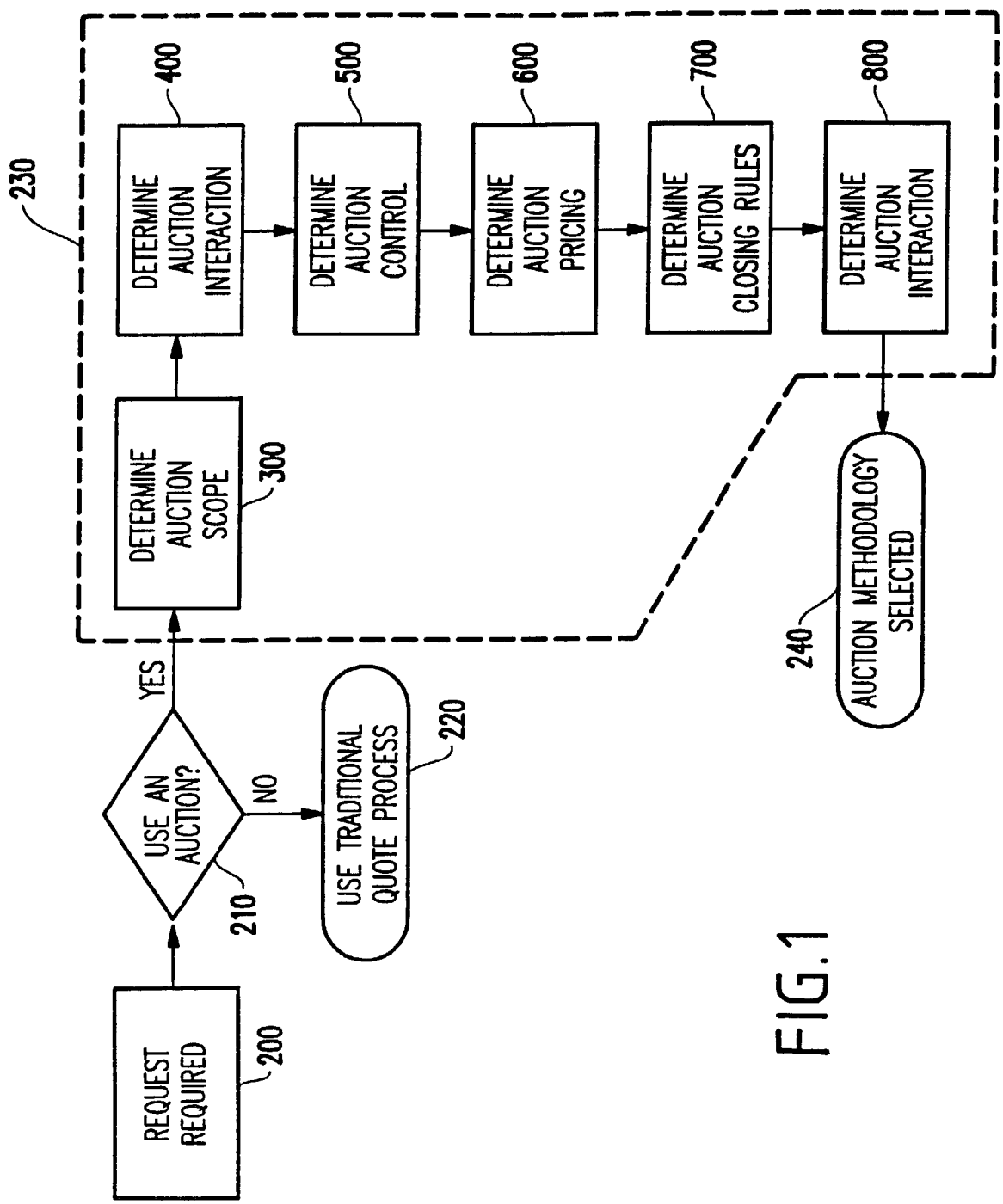
FIG. 1 is a flow diagram illustrating a preferred method of the present invention.

As previously mentioned, there is a need for a system and method for utilizing auctioning methodologies in various procurement processes. The claimed invention addresses this need by providing a system and method for determining the type of auction methodology to be used during a Request for Quotation (RFQ), Request for Proposal (RFP), or Request for Information (RFI) process.

Referring now to the drawings, and more particularly to FIGS. 1 through 9, there are shown preferred embodiments of the system and method according to the present invention. Specifically, in FIG. 1, there is shown a flow diagram illustrating a preferred method of the present invention in which the first step of the process for determining the type of auction methodology to be used during procurement processes comprises generating 200 a request in a data management system (not shown). This then leads to a logic process 210 where it is determined whether or not to use an auction methodology to select the supplier(s). If the decision is to not use an auction methodology to select the supplier(s) (no), then a traditional quote process 220 may be used such as IBM's IQT process. However, if the decision is to use an auction methodology to select the supplier(s) (yes), then the auction selection process 230 occurs.

There are certain circumstances which warrant use of a traditional quoting process 220 rather than using an auction selection methodology 230. For example, bids on certain commodities, such as tangible goods or products, are best suited for the present auction selection methodology, whereas bids on services are probably best suited for conventional quoting processes 220. However, the present auction selection methodology may be used for bids on services as well as tangible goods and is not limited to a particular service or tangible good.

The steps in the auction selection methodology 230 comprise determining the auction scope 300, determining the auction interaction 400, determining the auction control 500, determining the auction pricing 600, determining the auction closing rules 700, and determining the auction iteration 800. These steps, in turn, determine which particular auction methodology is selected 240.

There are several considerations, elements, factors, and conditions which affect the auction selection methodology. These control mechanisms are entered into the data processing system as data (control inputs), which then aid in selecting the proper auction methodology best suited for a particular procurement process.

Figure 2:
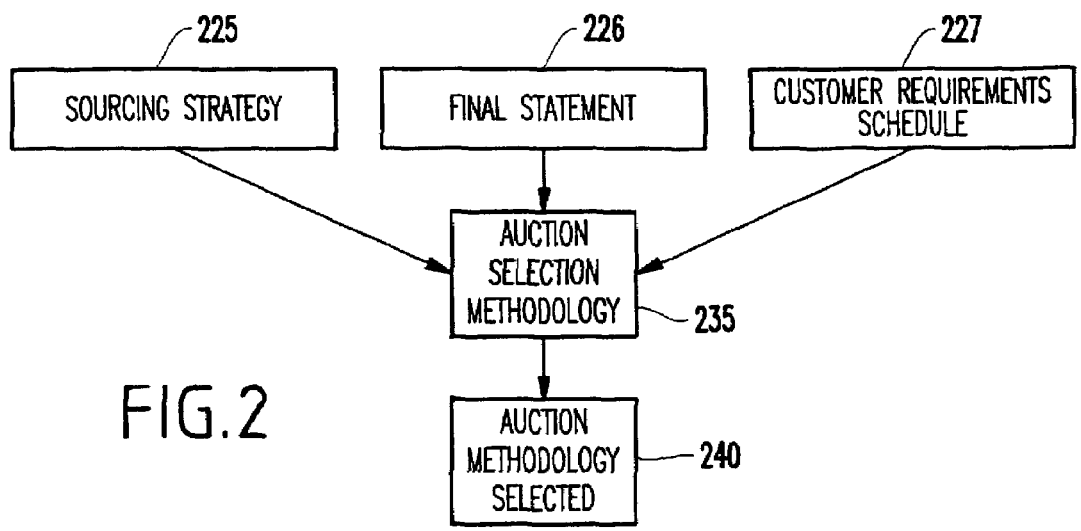
FIG. 2 is a flow diagram illustrating a preferred method of the present invention.

FIG. 2 shows the various forms of control data which are input into the data processing. For example, the particular sourcing strategy 225 to be used is input into the auction selection methodology 235 as a control mechanism to better select the most ideal supplier. That is, the buyer usually has a particular sourcing strategy which it desires to implement. Some examples of sourcing strategies are leveraging purchases, supply continuity, speed to market of new products, maintaining cost competitive advantages, expense reduction, and low inventory control (pull method). All of these strategies are important to maintain leadership in a competitive environment to gain market share and to deliver competitively-priced goods and services.

Another control input is to require a final statement 226 of customer requirements which is verified for accuracy. Customer requirements are verified for accuracy for defining the scope of work to be performed and/or for a list of requirements, specifications and details to be included in the RFQ, RFI, and RFP, which prevents having to repeat bids for inaccuracies to satisfy customer requirements and/or production needs.

Another control input is to provide a customer requirements schedule 227. Production has short lead times, especially where manufacturing and R&D (research development) are concerned. Therefore, production schedules are critical elements. These inputs 225-227 control the auction selection methodology process 235 and help to select the proper auction methodology 240.

The first sub-task of the process 230 requires determining the auction scope 300 which determines whether the bid (quote) will be public or directed. According to the present invention, a public quote is a quote which any supplier or potential supplier(s) can view and respond to, whereas a directed quote is a quote to which only a specific supplier or group of suppliers can view and respond.

Figure 3:
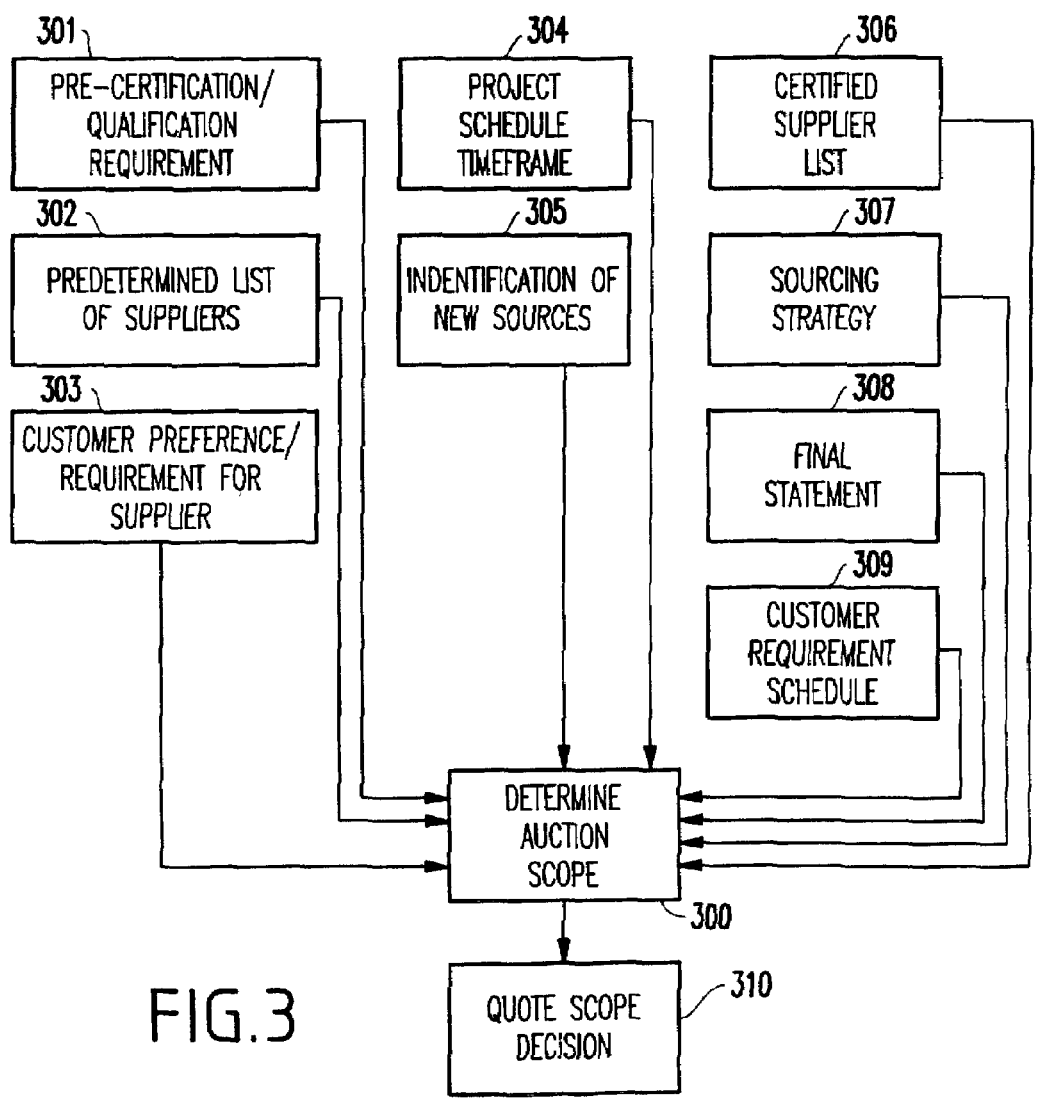
FIG. 3 is a flow diagram illustrating a preferred method of the present invention.

FIG. 3 illustrates the several control inputs which are involved here. First, there is a pre-certification/qualification requirement 301. A pre-certification/qualification requirement ensures that the supplier meets the financial commitment and has no exposure to the inability to meet quantity, quality or government specifications. This may include Dunn & Bradstreet reports, visits to the supplier, as well as references, etc. Next, the potential suppliers are limited to a predetermined list of suppliers 302 which aids in controlling the potential field of suppliers from which to choose (allow to bid against each other). Also, there is a customer preference control 303 which considers the various requirements for the supplier(s). Customer requirements can be the supplier's ability to meet schedules and to comply with quantity, delivery date(s), color, size, and product specifications, as well as labor, time, and materials, and travel (local or global). It also includes the ability to service on-site locations and to meet desired expectations of the customer.

Also, there is a project schedule time-frame control 304 which is necessary for the buyer to properly manage and to assure that a particular project, which is dependent on a particular product or service from a supplier, may be completed in a timely manner. Additionally, an identification of new sources 305 is another control input which identifies whether a particular product or service has known or limited sources.

Another control input is choosing from a certified supplier list 306, if required. This is important to assure the buyer that the supplier's bids on a particular quote are authentic and/or reputable. Three other control inputs include having a sourcing strategy 307, requiring a final statement 308 of customer requirements, which is verified for accuracy, and providing a customer requirements schedule 309, which are all important for the reasons previously recited. All of these control inputs 301-309 control the determination of the auction scope sub-process 300, which helps to select the proper quote scope decision 310.

The second sub-task of the process 230 is to determine the auction interaction 400. In this sub-task, it is determined whether a bid is open-cry, sealed, anonymous, or non-anonymous. According to the present invention, in an open-cry auction, also called an "English Auction," the suppliers gather at a common location, physical or virtual, at a pre-specified time. Each supplier can hear (or see) the bid submitted by a rival supplier and has a limited time to respond to it with a lower counter-bid. In physical auctions, the responses must be received within seconds while, in auctions held over the web-based settings such as the internet, it is conceivable that several minutes, hours, days or weeks will be allowed for the response.

According to the present invention, in a sealed-bid auction, the suppliers are required to submit their bids by a specified deadline. The buyer may keep the bid information secret until the deadline (or open them as they are received). At the close of the auction, all of the bids are evaluated and the winner(s) are declared.

The present invention also provides for an anonymous auction where the identity of the suppliers is concealed and, additionally, the final winning prices or amount of inventory can be concealed from the other bidders. Conversely, according to the present invention, in a non-anonymous auction, the identities of the suppliers or the final winning bid, or the amount of inventory, can be revealed to the other suppliers.

Figure 4:
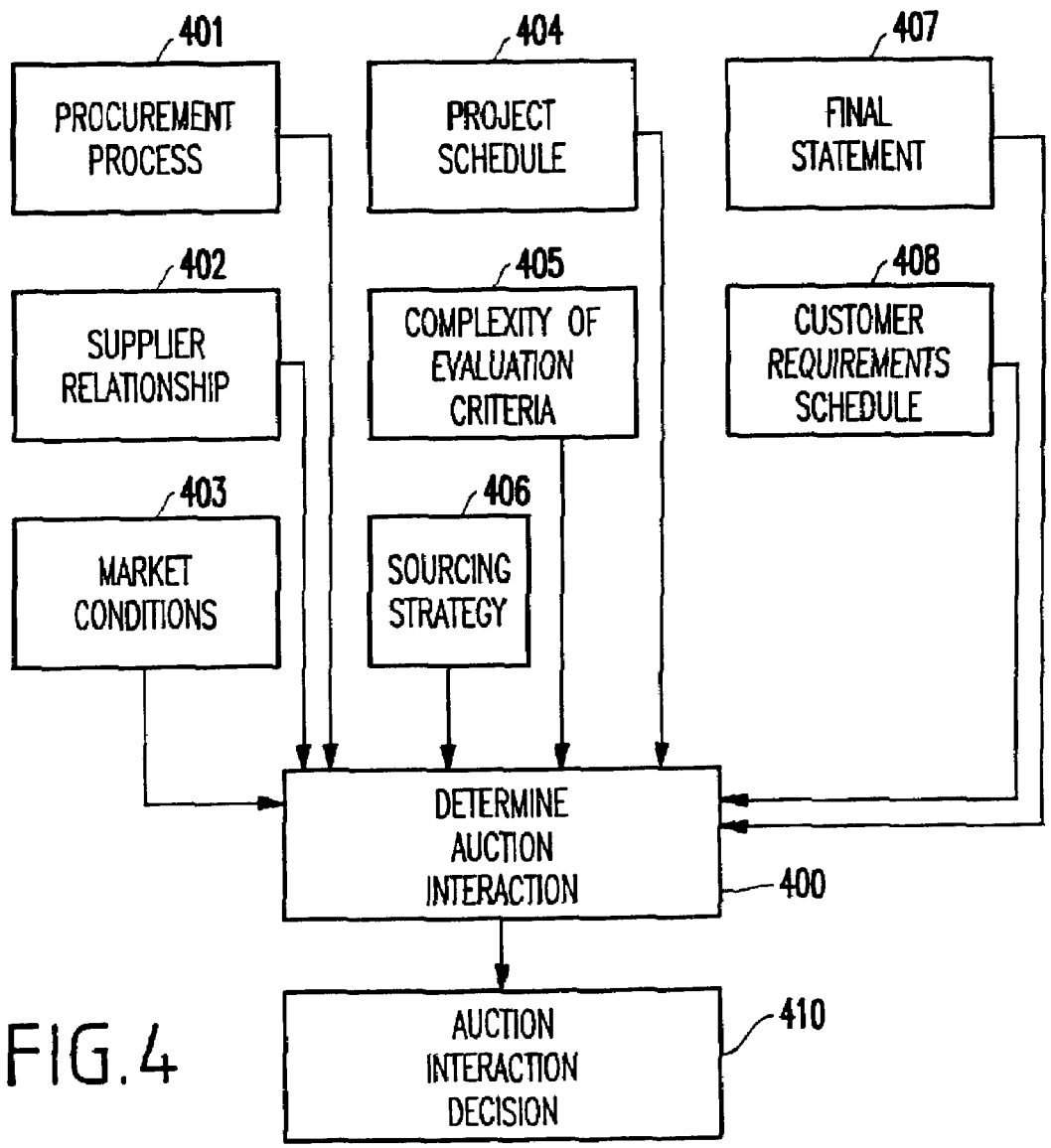
FIG. 4 is a flow diagram illustrating a preferred method of the present invention.

FIG. 4 identifies the various control inputs involved in the sub-task 400. First, the particular procurement practice 401 (which applies to only anonymous or non-anonymous auctions) is identified. All of the control inputs 403, 406, 405, 408, and 407 determine the anonymity issues to ensure that, if the requisition is identified as a critical need and the market conditions are weak and/or strong, the buyer will make a decision that will determine whether it can capture better price leveraging if all of the potential suppliers are known. Next, the supplier relationship 402 is identified. For example, it is determined whether the supplier is providing confidential information or if the supplier has an internal policy dictating its ability to make it's bid publicly-known. Also, the prevailing market conditions 403 must be accounted for. For example, conditions relating to the supplier's competitiveness or the overall market competitiveness, pricing trends, supply availability, etc., is important, as it helps identify which suppliers simply cannot follow-through on their bid. This applies only to open-cry or sealed auctions.

Another control is the project schedule 404. This applies only to open-cry or sealed auctions. Again, this is important for the buyer to properly manage and assure that a particular project, which is dependent on a particular product or service from a supplier, can be completed in a timely manner. Yet another control is the complexity of the evaluation criteria 405. Once again, this applies only to open-cry or sealed auctions. For example, it is necessary to consider whether a particular commodity is unique and, therefore, can only be provided by one or just a few suppliers. A specific example of this involves products which are patent protected and need to be licensed from a supplier. Also, there are state and federal guidelines to consider such as complying with OSHA (Occupational Safety and Health Administration) requirements. Furthermore, it is necessary to consider the number (amount) of evaluation criteria as this, most certainly, affects the project schedule 404. This affects the length of time the evaluation process will take and whether the initial and subsequent delivery schedules will be impacted by the criteria.

Three other control inputs include having a sourcing strategy 406, requiring a final statement 407 of customer requirements, which is verified for accuracy, and providing a customer requirements schedule 408, which are all important for the reasons previously recited. All of these control inputs 401-408 control the determination of the auction interaction sub-process 400 which helps to select the proper auction interaction decision 410.

The third sub-task of the process 230 is to determine the auction control 500. This is a process that determines whether the auction is controlled by regular or Dutch methodology. According to the present invention, in regular reverse auctions, goods or services are entered for bidding and the lowest bid received within the auction time frame is accepted and considered the winner. Conversely, according to the present invention, Dutch reverse auctions are better suited for perishable items such as vegetables or airplane seats. Here, the procurement representative (buyer) begins with a very low asking price and then gradually increases the asking price until suppliers emerge with bids specifying how many items they will purchase at the current asking price. The procurement representative (buyer) can continue raising the bid to maintain a stream of suppliers while the requirements remain open. Furthermore, according to the present invention, in a Dutch auction, incremental time and price parameters may be set to further control how the auction is performed. This is especially useful when it is recognized that demand is high and the buyer would like bidding to be extended to allow for additional bids. It is especially useful when there are more than one item of the same kind to sell because it allows bidders to specify the quantity that the purchasers wish to buy and the amount per item. Winning bidders are required to pay in a Dutch reverse methodology which is the same as the lowest offering, thereby creating a very competitive procurement apportioned.

Figure 5:
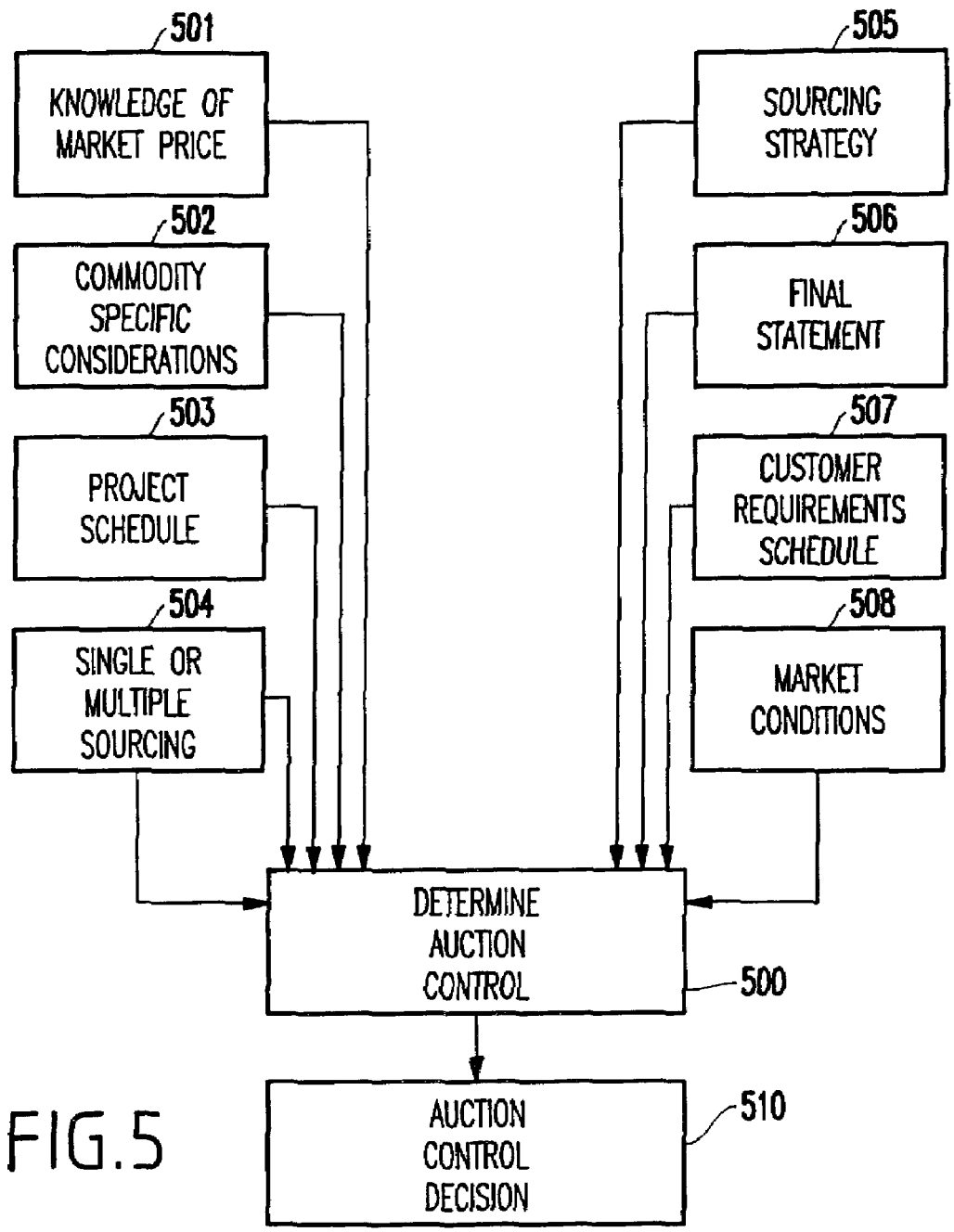
FIG. 5 is a flow diagram illustrating a preferred method of the present invention.

The various control inputs involved in this sub-task 500 are illustrated in FIG. 5. First, it is essential to have an accurate knowledge of the market price 501 which varies by commodity. Next, there are commodity-specific considerations 502 such as the shelf-life of a particular good (or service, if applicable). Then, there is the project schedule 503 to consider. For example, according to the present invention, the Dutch auction only allows one bid, whereas the regular auction allows more than one bid. Thus, this affects the time-frame and the project schedule 503.

Furthermore, it is important to consider whether there is (or will be) single or multiple sourcing 504. That is, whether a particular good or service can be provided by multiple suppliers, or is there only one supplier who can bid on a particular quote. Again, there may be intellectual property rights, such as patent protection on a particular good, which dictate whether only a single supplier can provide the good.

Some other control inputs include having a sourcing strategy 505, requiring a final statement 506 of customer requirements, which is verified for accuracy, and providing a customer requirements schedule 507, which are all important for the reasons previously recited. Also, the prevailing market conditions 508 must be accounted for. For example, conditions relating to the supplier's competitiveness or the overall market competitiveness, pricing trends, supply availability, etc., are important, as they help identify which suppliers simply cannot follow through on their bid. All of these control inputs 501-508 control the determination of the auction control sub-process 500 which helps to select the proper auction control decision 510.

The fourth sub-task of the process 230 is to determine the auction pricing 600. This is a process that determines whether pricing will be discriminative or non-discriminative. According to the present invention, in a discriminative Auction, also known as a "Yankee Auction," the winning supplier(s) pay what they bid, whereas, in a non-discriminative auction, suppliers with winning bids pay the same price based on the highest price of the bids awarded.

Figure 6:
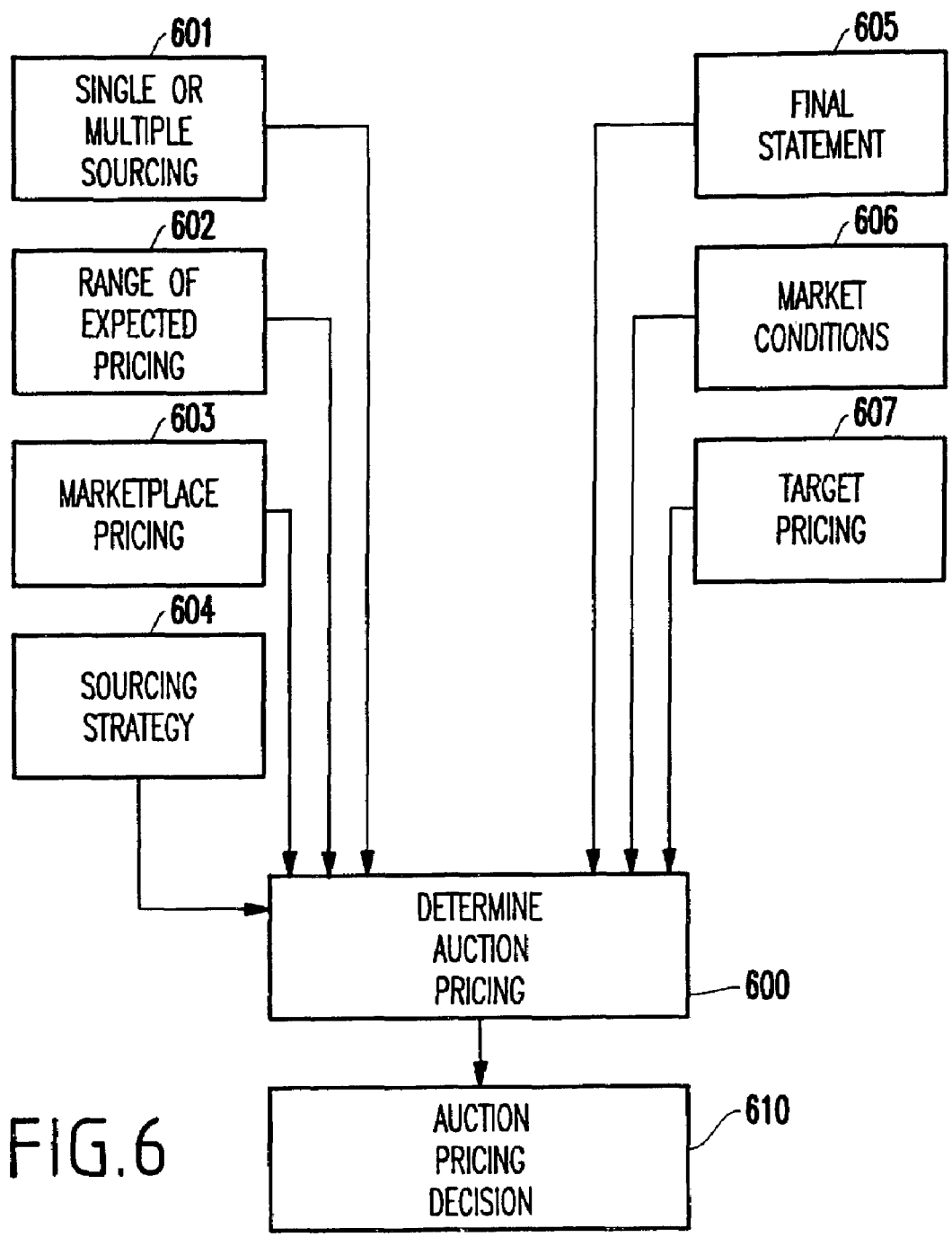
FIG. 6 is a flow diagram illustrating a preferred method of the present invention.

As shown in FIG. 6, there are several control inputs in the auction pricing process 600. First, it needs to be determined whether there is single or multiple sourcing 601. That is, whether a particular good or service can be provided by multiple suppliers or whether there is only one supplier who can bid on a particular quote. Again, there may be intellectual property rights, such as patent protection on a particular good, which dictate whether only a single supplier can provide the good. Next, the range of expected pricing 602 (high and low) is considered. This is important as it helps the buyer to set its budget and anticipate its buying power. Then, the marketplace pricing 603 is considered, which is necessary as it helps the buyer to anticipate the bid a particular quote will yield. It is similar to the range of expected pricing control 602.

Additional control inputs include having a sourcing strategy 604, requiring a final statement 605 of customer requirements, which is verified for accuracy, and accounting for the prevailing market conditions 606, which are all important for the reasons previously recited. Finally, the target pricing 607 of the bid must be anticipated because it helps the buyer to establish its budget for a particular project.

All of these control inputs 601-607 control the determination of the auction pricing sub-process 600, which aids in selecting the proper auction pricing decision 610 and in determining whether the award of the bid is based on discriminative or non-discriminative pricing.

The fifth sub-task of the process 230 is to determine the auction closing rules 700. This is a process 230 that determines the rules that govern the closing of the auction process. There are several rules that govern the closing of an auction according to the present invention. For example, whether the auction ends by buyer's manual intervention, at a fixed time, automatically after a fixed period of bidder (supplier) inactivity, or some combination thereof Specifically, a buyer's manual intervention occurs when the buyer decides to close the auction. A fixed time intervention occurs when the auction closes at a fixed time which is determined by the buyer. Moreover, in an intervention that automatically occurs after some amount of supplier inactivity, the auction will automatically end after some amount of time (to be determined) of bidder inactivity, i.e., no bid submissions for a specific amount of time.

Figure 7:
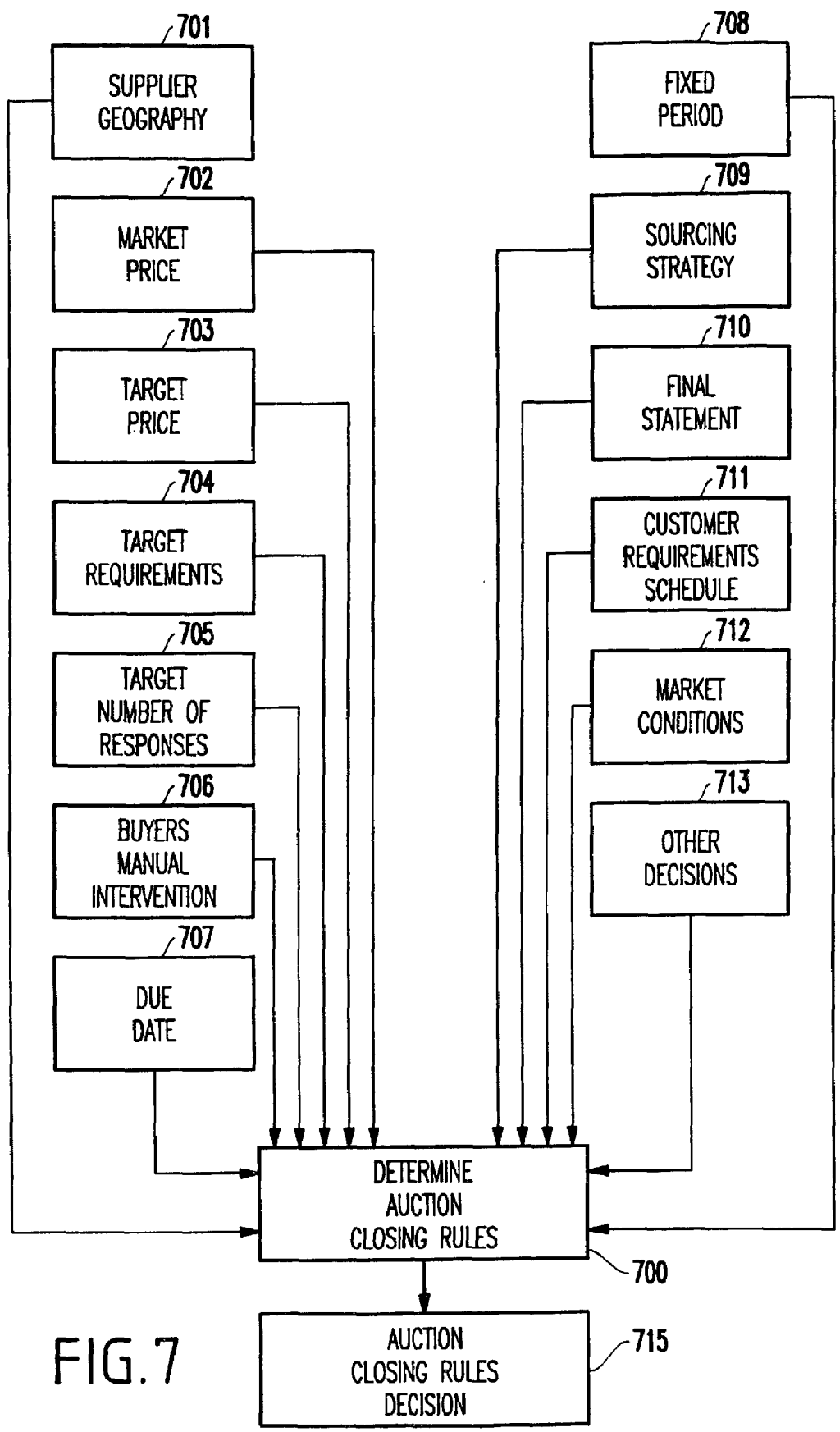
FIG. 7 is a flow diagram illustrating a preferred method of the present invention.
Figure 8:
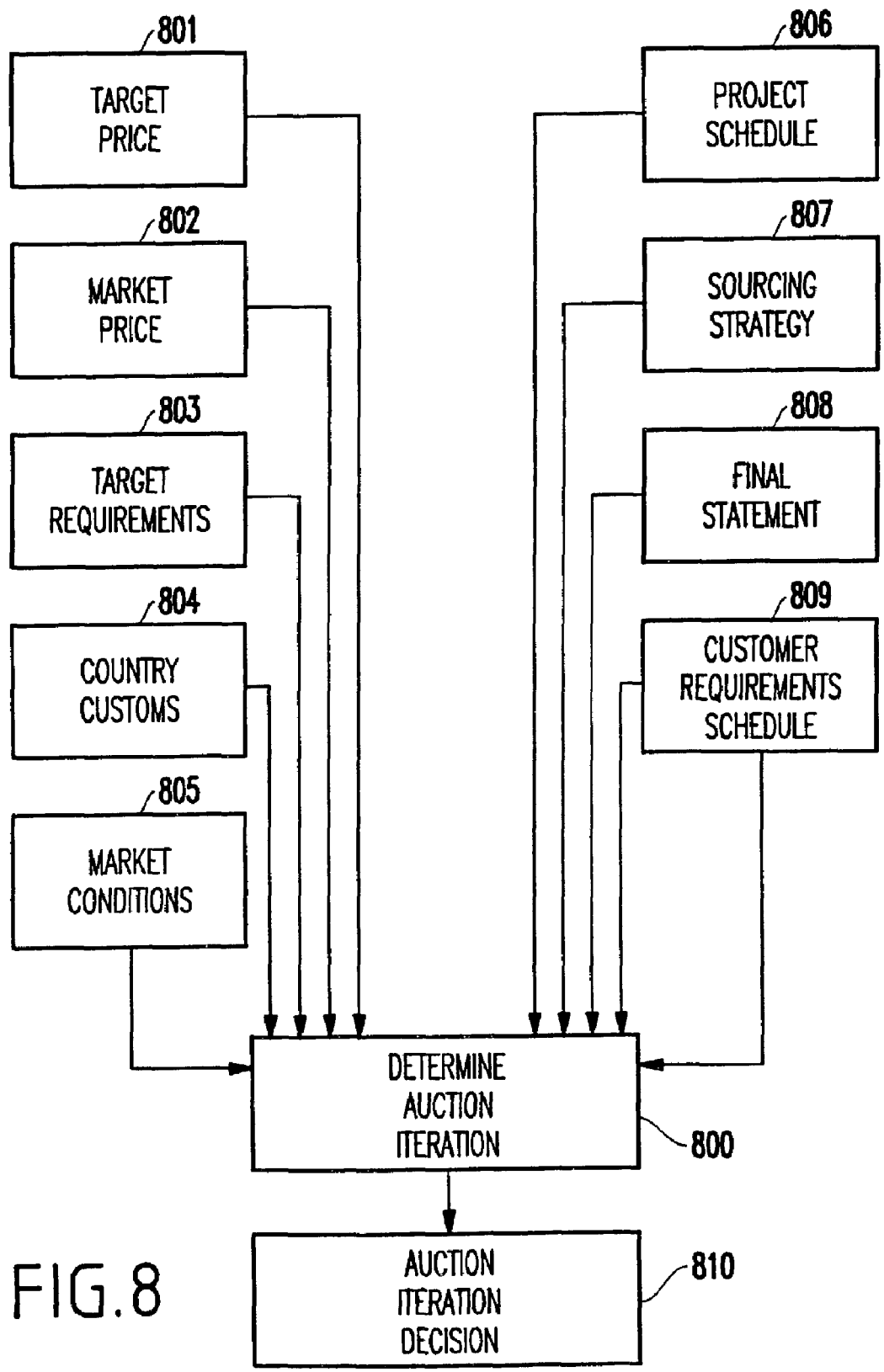
FIG. 8 is a flow diagram illustrating a preferred method of the present invention.

Several control inputs affect this process 700 as shown in FIG. 7. One control mechanism is the supplier geography 701. For example, operating in a global/regional time zone may expand/limit the time that the auction occurs. Next, the marketplace pricing 702 is considered, which is necessary, as it helps the buyer to anticipate the bid a particular quote will yield. Also, the target pricing 703 of the bid must be anticipated because it helps the buyer to establish its budget for a particular project. Furthermore, other target requirements 704 are considered, such as the quantity of goods desired and the lead-time in acquiring the goods from the supplier. Moreover, the target number of responses 705 is important as it helps to establish the potential number of bidders for a particular quote.

As mentioned, three potential closing rules, namely, the manual intervention by the buyer 706, the fixed time (due date) intervention 707, and the intervention by supplier quoting inactivity (fixed period of supplier inactivity) 708 also serve as controls for this sub-process 700, as each determines the length of time the auction will last.

Additional control inputs include having a sourcing strategy 709, requiring a final statement 710 of customer requirements, which is verified for accuracy, establishing a customer requirements schedule 711, accounting for the prevailing market conditions 712, all of which are significant for the reasons previously recited. Finally, other decisions 713 pertaining to the other decision sub-processes, such as decisions on the quote scope 300, interaction 400, control 500, pricing 600, and iteration 800 (which will be discussed next) act as controls for this sub-process 700, as they show the interconnectiveness of the entire selection process 230.

All of the control inputs 701-713 control the determination of the auction closing rules sub-process 700, which helps to select the proper auction closing rules decision 715 and, as such, how and when the auction will terminate.

The final sub-task is determining the auction iteration 800. This is a process that determines whether single or multiple rounds of auction participation will be allowed from the same supplier. There are two types of auction iterations provided by the present invention, i.e., single round and multiple round iterations. In a single round iteration, bids are established such that each supplier can respond only once to a quote. Conversely, according to the present invention, in multiple round iterations, bids have a deadline for each round of bids and at that deadline, either the auction is closed or the bids from the current round are publicized and a fresh round of bids is solicited by some newly-defined deadline.

As with the other sub-tasks, this sub-task 800 has multiple input controls. For example, the target price 801, market price 802, target requirements 803, prevailing market conditions 805, project schedule 806, sourcing strategy 807, final statement of customer requirements, which are verified for accuracy 808, and the customer requirements schedule 809 are all considered for the reasons previously recited. Moreover, a particular country's customs 804 is a further consideration. For example, a supplier from a particular country which customarily uses haggling in its procurement process is an important consideration, as it may broaden some of the pricing targets.

All of these control inputs 801-809 control the determination of the auction interaction sub-process 800, which help to select the proper auction interaction decision 810 and, as such, the manner in which the auction operates (i.e., the decision on the number of rounds/auctions).

Figure 9:
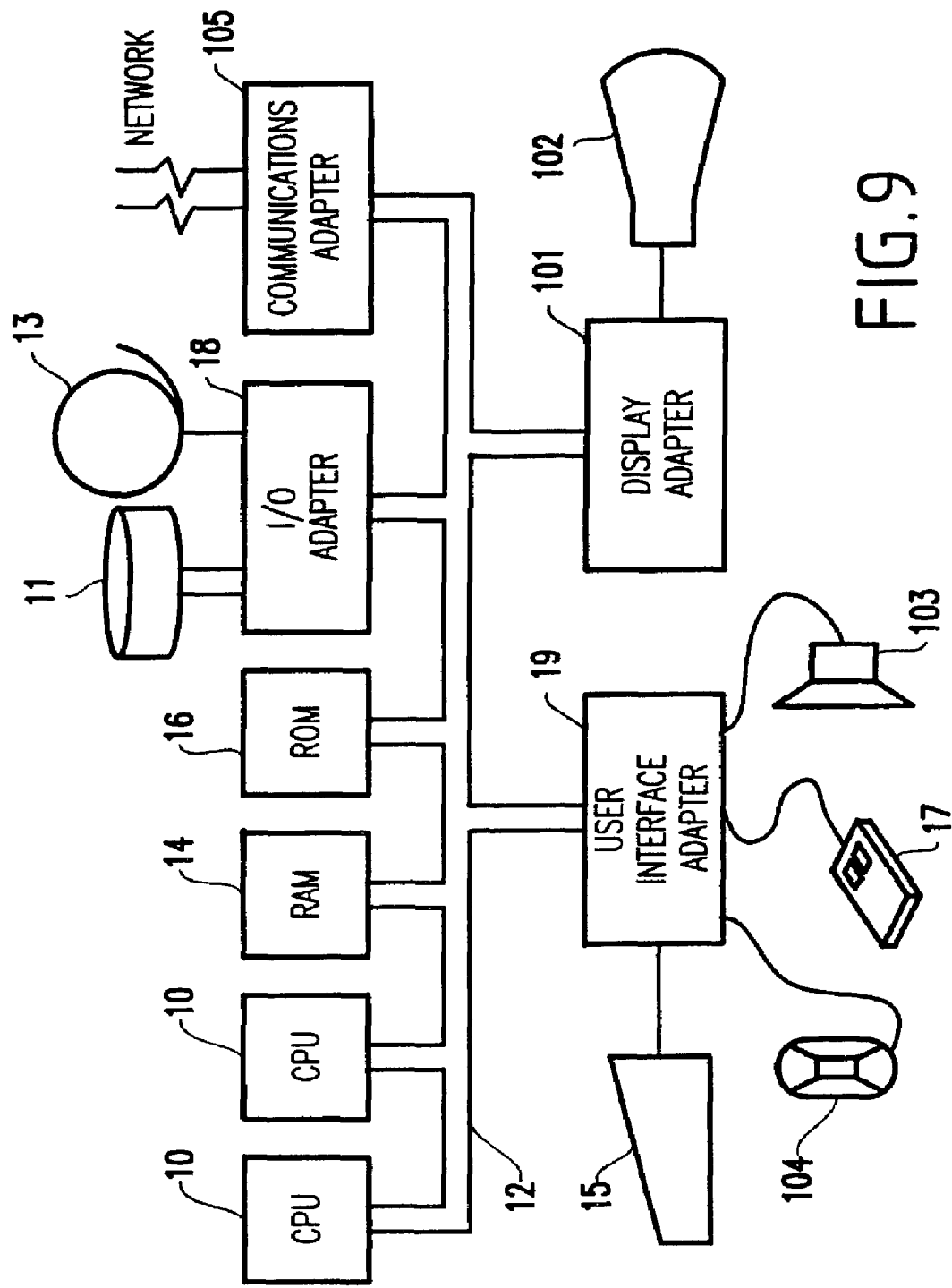
FIG. 9 is a system diagram according to the present invention.

A representative hardware environment for practicing the present invention is depicted in FIG. 9 which illustrates a typical hardware configuration of an information handling/computer system in accordance with the present invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as a touch screen device (not shown) to bus 12, communication adapter 105 for connecting the information handling system to a data processing network, and display adapter 101 for connecting bus 12 to display device 102. A program storage device readable by the disk or tape units is used to load the instructions, which operate the invention, which is loaded onto the computer system.

As mentioned, the present invention allows suppliers the ability to essentially "bid against" one another as one would do in an auction setting, thereby further reducing cycle times and administrative costs for the buyer, as the buyer would no longer be required to review every bid entered by the various suppliers. Rather, the supplier who "out bids" the other suppliers would simply be selected by the buyer.

Moreover, the present invention factors in several control elements which significantly impact the auction selection process, thereby streamlining the entire process and, thus, making the selection of the type of auction methodology ultimately chosen the correct decision. This assures the buyer that its procurement process is functionally optimal and saves the buyer resources and money, as it results in an efficient procurement system. Furthermore, by implementing the present invention into a web-based system, it provides an alternative, yet novel, solution to the conventional quoting/bidding systems.

The present invention embodies an ethical guideline and allows procurement to be involved in sourcing activities rather than administrative duties of managing a paper business methodology within an organization. Moreover, the present invention is a highly traceable and auditable system which can also provide accurate purchasing/selling details.

While the invention has been described in terms of preferred embodiments, those skilled in the art will recognize that the invention can be practiced with modification within the spirit and scope of the appended claims.

What is claimed is:

1. A web-based method for selecting an auction methodology for use in a buyer/supplier business-to-business process and a government procurement process comprising any of a request for information, a request for quotations, and a request for proposals, said method comprising:

determining an auction scope in a data processing system, wherein said auction scope comprises (i) a supplier qualification input indicating that said supplier can meet financial, quantity, quality, scheduled deadlines, travel, and governmental specification requirements relating to supplying a particular commodity to said buyer, (ii) a predetermined list of suppliers permitted to bid against one another, (iii) a new sources input that identifies whether said particular commodity has known or limited sources, and (iv) a customer preference control;

determining an auction interaction in said data processing system;

determining an auction control in said data processing system;

determining an auction pricing in said data processing system;

determining a set of auction closing rules in said data processing system;

determining an auction iteration in said data processing system; and selecting an auction methodology based on at least one of said auction scope, said auction interaction, said auction control, said auction pricing, said auction closing rules, and said auction iteration, wherein the selecting process allows a buyer to select bids from a supplier without requiring said buyer to review all bids from all suppliers in order to receive a desired response to any of said request for information, said request for quotations, and said request for proposals, wherein said desired response is dictated by control parameters established by said buyer.

2. The method according to claim 1, all the limitations of which are incorporated herein by reference, wherein said step of determining an auction scope comprises determining whether a request for a bid from a supplier is one of a public request and a directed request.

3. The method according to claim 1, all the limitations of which are incorporated herein by reference, wherein said step of determining an auction interaction comprises selecting one of an open-cry auction methodology, a sealed-bid auction methodology, an anonymous auction methodology, and a non-anonymous auction methodology.

4. The method according to claim 1, all the limitations of which are incorporated herein by reference, wherein said step of determining an auction control comprises selecting one of a regular reverse auction methodology and a Dutch reverse auction methodology.

5. The method according to claim 1, all the limitations of which are incorporated herein by reference, wherein said step of determining an auction pricing comprises
    selecting one of a discriminative auction methodology and a non-discriminative auction methodology.

6. The method according to claim 1, all the limitations of which are incorporated herein by reference, wherein said step of determining a set of auction closing rules comprises ending an auction with one or more of a buyer's manual intervention, a fixed time intervention, and an automatic intervention, wherein said automatic intervention occurs after a predetermined amount of supplier inactivity in said auction.

7. The method according to claim 1, all the limitations of which are incorporated herein by reference, wherein said step of determining an auction iteration comprises selecting one of a single round iteration methodology and a multiple round iteration methodology.

8. A method for selecting an auction methodology for use in a buyer/supplier business-to-business process and a government procurement process comprising any of a request for information, a request for quotations, and a request for proposals, said method comprising:

determining one or more of an auction scope, an auction interaction, an auction control, an auction pricing, a set of auction closing rules, and an auction iteration in a data processing system, wherein said auction scope comprises (i) a supplier qualification input indicating that said supplier can meet financial, quantity, quality, scheduled deadlines, travel, and governmental specification requirements relating to supplying a particular commodity to said buyer, (ii) a new sources input that identifies whether said particular commodity has known or limited sources, and (iii) a customer preference control; and selecting an auction methodology based on said one or more of said auction scope, said auction interaction, said auction control, said auction pricing, said auction closing rules, and said auction iteration such that said buyer only reviews bids submitted by a supplier who outbids all other suppliers, wherein the determining of said auction interaction comprises determining whether there are government compliance guidelines affecting the procurement of a particular commodity including an attachment of intellectual property rights associated with said particular commodity, and wherein the selecting process allows a buyer to select bids from a supplier without requiring said buyer to review all bids from all suppliers in order to receive a desired response to any of said request for information, said request for quotations, and said request for proposals, wherein said desired response is dictated by control parameters established by said buyer.

9. The method according to claim 8, all the limitations of which are incorporated herein by reference, wherein said auction scope comprises determining whether a request for a bid from a supplier is one of a public request and a directed request.

10. The method according to claim 8, all the limitations of which are incorporated herein by reference, wherein said auction interaction comprises selecting one of an open-cry auction methodology, a sealed-bid auction methodology, an anonymous auction methodology, and a non-anonymous auction methodology.

11. The method according to claim 8, all the limitations of which are incorporated herein by reference, wherein said auction control comprises selecting one of a regular reverse auction methodology and a Dutch reverse auction methodology.

12. The method according to claim 8, all the limitations of which are incorporated herein by reference, wherein said auction pricing comprises selecting one of a discriminative auction methodology and a non-discriminative auction methodology.

13. The method according to claim 8, all the limitations of which are incorporated herein by reference, wherein said set of auction closing rules comprises ending an auction with one or more of a buyer's manual intervention, a fixed time intervention, and an automatic intervention, wherein said automatic intervention occurs after a predetermined amount of supplier inactivity in said auction.

14. The method according to claim 8, all the limitations of which are incorporated herein by reference, wherein said auction iteration comprises selecting one of a single round iteration methodology and a multiple round iteration methodology.

15. A program storage device readable by computer, tangibly embodying a program of instructions executed by said computer to perform a web-based method for selecting an auction methodology for use in a buyer/supplier business-to-business process and a government procurement process comprising any of a request for information, a request for quotations, and a request for proposals, said method comprising:

determining an auction scope in a data processing system, wherein said auction scope comprises (i) a supplier qualification input indicating that said supplier can meet financial, quantity, quality, scheduled deadlines, travel, and governmental specification requirements relating to supplying a particular commodity to said buyer, (ii) a new sources input that identifies whether said particular commodity has known or limited sources, and (iii) a customer preference control;

determining an auction interaction in said data processing system;

determining an auction control in said data processing system;

determining an auction pricing in said data processing system;

determining a set of auction closing rules in said data processing system;

determining an auction iteration in said data processing system; and selecting an auction methodology based on at least one of said auction scope, said auction interaction, said auction control, said auction pricing, said auction closing rules, and said auction iteration such that said buyer only reviews bids submitted by a supplier who outbids all other suppliers, wherein the determining of said auction interaction comprises determining whether there are government compliance guidelines affecting the procurement of a particular commodity including an attachment of intellectual property rights associated with said particular commodity, and wherein the selecting process allows a buyer to select bids from a supplier without requiring said buyer to review all bids from all suppliers in order to receive a desired response to any of said request for information, said request for quotations, and said request for proposals, wherein said desired response is dictated by control parameters established by said buyer.

16. The program storage device according to claim 15, all the limitations of which are incorporated herein by reference, wherein said step of determining an auction scope comprises determining whether a request for a bid from a supplier is one of a public request and a directed request.

17. The program storage device according to claim 15, all the limitations of which are incorporated herein by reference, wherein said step of determining an auction interaction comprises selecting one of an open-cry auction methodology, a sealed-bid auction methodology, an anonymous auction methodology, and a non-anonymous auction methodology.

18. The program storage device according to claim 15, all the limitations of which are incorporated herein by reference, wherein said step of determining an auction control comprises selecting one of a regular reverse auction methodology and a Dutch reverse auction methodology.

19. The program storage device according to claim 15, all the limitations of which are incorporated herein by reference, wherein said step of determining an auction pricing comprises selecting one of a discriminative auction methodology and a non-discriminative auction methodology.

20. The program storage device according to claim 15, all the limitations of which are incorporated herein by reference, wherein said step of determining a set of auction closing rules comprises ending an auction with one or more of a buyer's manual intervention, a fixed time intervention, and an automatic intervention, wherein said automatic intervention occurs after a predetermined amount of supplier inactivity in said auction.

21. The program storage device according to claim 15, all the limitations of which are incorporated herein by reference, wherein said step of determining an auction iteration comprises selecting one of a single round iteration methodology and a multiple round iteration methodology.

* * * * *